(12) United States Patent
Dow et al.

(10) Patent No.: US 9,529,620 B1
(45) Date of Patent: Dec. 27, 2016

(54) TRANSPARENT VIRTUAL MACHINE OFFLOADING IN A HETEROGENEOUS PROCESSOR

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Charles J. Stocker, IV, Plainsboro, NJ (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/972,179

(22) Filed: Dec. 17, 2015

(51) Int. Cl.
*G06F 9/46* (2006.01)
*G06F 9/455* (2006.01)

(52) U.S. Cl.
CPC ........... *G06F 9/45558* (2013.01); *G06F 9/455* (2013.01); *G06F 9/45533* (2013.01); *G06F 9/45554* (2013.01); *G06F 2009/4557* (2013.01)

(58) Field of Classification Search
CPC ..................... G06F 9/45558; G06F 2009/4557; G06F 9/455; G06F 9/45533; G06F 9/45554
See application file for complete search history.

(56) References Cited

U.S. PATENT DOCUMENTS

| | | | | |
|---|---|---|---|---|
| 2006/0218544 A1* | 9/2006 | Chakraborty | ............. | G06F 8/63 717/168 |
| 2008/0141264 A1* | 6/2008 | Johnson | .................. | G06F 9/455 718/105 |
| 2008/0163239 A1* | 7/2008 | Sugumar | ............... | G06F 9/5088 718/105 |
| 2009/0249333 A1* | 10/2009 | Yamaguchi | ............. | G06F 9/455 718/1 |
| 2009/0271646 A1* | 10/2009 | Talwar | .................. | G06F 1/3203 713/322 |
| 2010/0005465 A1* | 1/2010 | Kawato | .................... | G06F 9/455 718/1 |
| 2010/0138828 A1* | 6/2010 | Hanquez | ............. | G06F 9/45533 718/1 |
| 2010/0250824 A1* | 9/2010 | Belay | .................. | G06F 9/45558 711/6 |

(Continued)

FOREIGN PATENT DOCUMENTS

CN 103559084 A 2/2014

OTHER PUBLICATIONS

Cho et al.; "Real User-Environment Migration Between Heterogeneous ISA platforms", CUIMC Feb. 22, 2012, Copyright 2012 ACM, (Cho_2012.pdf; pp. 1-9).*

(Continued)

*Primary Examiner* — Hiren Patel
(74) *Attorney, Agent, or Firm* — Cantor Colburn LLP; Steven Chiu (57) ABSTRACT

Aspects relate to offloading virtual machines (VMs). Aspects include identifying a VM for offload from a mainframe processor of a heterogeneous processor to a specialty processor of the heterogeneous processor. The mainframe processor is emulated by the specialty processor. The VM is migrated from the mainframe processor to the specialty processor, and the VM is activated on the specialty processor.

7 Claims, 4 Drawing Sheets

(56) References Cited

U.S. PATENT DOCUMENTS

| | | | | |
|---|---|---|---|---|
| 2010/0299130 | A1* | 11/2010 | Mitsuzawa | G06F 9/4856 703/26 |
| 2011/0119427 | A1* | 5/2011 | Dow | G06F 9/5088 711/6 |
| 2011/0231839 | A1* | 9/2011 | Bennett | G06F 9/45558 718/1 |
| 2011/0265084 | A1* | 10/2011 | Knowles | G06F 9/461 718/1 |
| 2012/0324073 | A1* | 12/2012 | Dow | G06F 9/5088 709/223 |
| 2012/0324445 | A1* | 12/2012 | Dow | G06F 9/45504 718/1 |
| 2012/0331147 | A1 | 12/2012 | Dutta et al. | |
| 2013/0111484 | A1* | 5/2013 | Chen | G06F 11/0757 718/102 |
| 2013/0247046 | A1* | 9/2013 | Asai | G06F 9/45508 718/1 |
| 2013/0318528 | A1 | 11/2013 | Hirose | |
| 2013/0346613 | A1* | 12/2013 | Tarasuk-Levin | G06F 9/45558 709/226 |
| 2014/0115183 | A1* | 4/2014 | Mitsunobu | H04L 47/621 709/232 |
| 2014/0157257 | A1* | 6/2014 | Dow | G06F 9/45558 718/1 |
| 2015/0254084 | A1* | 9/2015 | Kruglick | G06F 9/44521 718/1 |
| 2015/0269002 | A1* | 9/2015 | Yoshimoto | G06F 9/5038 718/1 |
| 2015/0378762 | A1* | 12/2015 | Saladi | G06F 9/45558 718/1 |
| 2016/0004552 | A1* | 1/2016 | Innan | G06F 9/5088 718/1 |

OTHER PUBLICATIONS

Koichi Onoue et al., "A Virtual Machine Migration System Based on a CPU Emulator", Second International Workshop on Virtualization Tech. in Distributed Computing, copyright 2006, IEEE, (Onoue_2006.pdf; pp. 1-8).*

Stefan Groesbrink, "Basics of virtual machine migration on heterogeneous architecture for self-optimizing mechatronics systems" Published online: Oct. 29, 2012, University of Paderborn, Germany (Groesbrink_OCT20.pdf; pp. 1-11).*

S. S Groesbrink; "A First Step toward Real-Time Virtual Machine Migration in Heterogeneous Multi-process systems", University of Paderborn, Germany; 1$^{st}$ Joint International Symposium on System-Integrated Intelligence 2012; (Groesbrink_2012.pdf.*

* cited by examiner

TRANSPARENT VIRTUAL MACHINE OFFLOADING IN A HETEROGENEOUS PROCESSOR

BACKGROUND

The present disclosure relates to virtual machines (VMs) and, more specifically, to transparent VM offloading in a heterogeneous processor.

A contemporary VM is a software implementation of a machine (i.e., a computer) that executes programs on a physical machine. A VM typically emulates a physical computing environment with requests for central processing unit (CPU), memory, hard disk, network and other hardware resources being managed by a virtualization layer which translates these requests to the underlying physical hardware. VMs are created within a virtualization layer, such as a hypervisor or a virtualization platform that runs on top of a client or server operating system (OS). The virtualization layer is typically used to create many individual, isolated VMs within a single, physical machine. Multiple VMs are typically used in server consolidation, where different services that were previously run on individual machines are instead run on isolated VMs on the same physical machine.

System offloads (also referred to herein as system migrations) of VMs are performed for a variety of reasons including the management of workloads, and to provide a back-up system while hardware and/or software upgrades are being installed. System migrations are also performed to move a VM to a new processor or other hardware. There are a variety of methods for performing VM migration including halting execution of the VM to perform the migration; as well as performing a live migration which migrates a VM while it is executing.

SUMMARY

According to an embodiment, a method, system, and computer program product for offloading virtual machines (VMs). The method includes identifying a VM for offload from a mainframe processor of a heterogeneous processor to a specialty processor of the heterogeneous processor. The mainframe processor is emulated by the specialty processor. The VM is migrated from the mainframe processor to the specialty processor, and the VM is activated on the specialty processor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments relate to offloading virtual machines (VMs) from mainframe processors to specialty processors that are capable of emulating mainframe processors. In embodiments, a VM that is idle (or nearly idle) can be offloaded from a mainframe processor to a specialty processor, thus freeing the mainframe processor from the compute cycles required to maintain the idle VM. In addition, a VM that is consuming a large number of compute cycles on a mainframe processor can be offloaded to a specialty processor, thus freeing up the mainframe processor to perform other operations and allowing the compute intensive VM to execute on a lower cost processor. In embodiments, the specialty processor that is chosen is one that is configured for optimal performance of the tasks executed by the VM. Embodiments also include moving the VM back to the mainframe processor based, for example, on the VM becoming active.

In embodiments, the VM offloading is performed in a transparent manner. As used herein the term "transparent" refers to the application not needing any modifications, to source code or binary, in order to run on another machine. Transparent also means that users of this VM do not see any impact at runtime, save for any potential performance degradation. The difference between transparent and non-transparent VM offloading is whether there is a visible interruption in the services provided by said virtual machine during or after a migration as compared to the pre-migration state.

As used herein, the term "mainframe processor" refers to a processor that is available to the general operating system (OS) and application software. Examples of mainframe processors include, but are not limited to: IBM z Systems™; Integrated Facility for Linux® (IFL); System Assist Processor (SAP); Integrated Coupling Facility (ICF); System z Application Assist Processor (zAAP); and System z Systems Integrated Information Processor (zIIP).

As used herein, the terms "specialty processor" and "blade processor" are used interchangeably to refer to a hardware processor that is configured to process a specific type of workload. In general, specialty processors may cost less than mainframe processors to purchase and may be less expensive than mainframe processors to maintain due, at least in part, to the way that they are treated in software pricing calculations. Examples of specialty processors include, but are not limited to: server blade processors from Intel; and power blade processors from IBM. Blades can be referred to by the IBM product name z BladeCenter Extension (zBX). The present generation hardware providing this capability includes such hardware, infrastructure, and integrated support as is found in the IBM BladeCenter PS701 Express and IBM BladeCenter HX5 blade servers attached to IBM z Systems™. These hardware systems (of one architecture, either Power or Intel processor designs) are logically coupled to a mainframe (i.e., a computer of a second architecture) to expand the z Systems portfolio to applications running on AIX, Linux, System x, and Microsoft Windows. Such a coupling can be operatively managed by the IBM z Unified Resource Manager that acts as a control plane across the disparate hardware platform being managed.

In embodiments, the specialty processor must have an instruction set capable of performing emulation of the System z architecture (i.e., the primary system architecture of the mainframe, System z processors). Generally any contemporary general purpose processor includes sufficient instructions such that software enablement, working in conjunction with the processor, can emulate all necessary instructions provided on the System z mainframe. Since the late 1990s, personal computer (PC) processors have become fast enough to perform mainframe emulation without the need for a peripheral card or specialty hardware. There are currently several PC emulators available that support System/390® and z/Architecture® that can perform the type of software emulation described herein:

QEMU is a generic and open source machine emulator and virtualizer. When used as a machine emulator, QEMU can run operating systems and programs made for one machine (e.g. an ARM board) on a different machine (e.g. your own PC). By using dynamic translation, QEMU can achieve good performance.

FLEX-ES by Fundamental Software which emulates both System/390 (ESA/390) and z/Architecture.

Hercules is an open source emulator which can emulate the System/370, System/390, and z/Architecture instruction sets. It does however require a complete operating system in order to execute application programs.

IBM System z Personal Development Tool (zPDT) from IBM.

"Specialty processors" can be distinguished by their instruction set architecture being physically or logically constrained in firmware such that they do not support the primary computing architecture of the system being emulated natively or completely. Nominally these specialty processors are from a commodity class of processors available at lower cost than those of special purpose mainframe processors for instance.

When a guest computer system (e.g., a mainframe processor) is emulated on a host computer system (e.g., a specialty processor), the guest computer system is said to be a "virtual machine" (VM) because the guest computer system exists in the host computer system as a pure software representation of the operation of one or more specific hardware architectures. The terms emulator, VM, and processor emulation are sometimes used interchangeably to denote the ability to mimic or emulate the hardware architecture of an entire computer system. The operation of these components is emulated in the VM that is being run on the host machine. An emulator program executing on the OS software and hardware architecture of the host computer mimics the operation of the entire guest computer system.

In embodiments, the emulator program acts as the interchange between the hardware architecture of the host machine and the instructions transmitted by the software running within the emulated environment. This emulator program may be a host OS (HOS), which is an OS running directly on the physical computer hardware. Alternately, the emulated environment can also be a VM monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A HOS and a VMM may run side-by-side on the same physical hardware.

Figure 1:
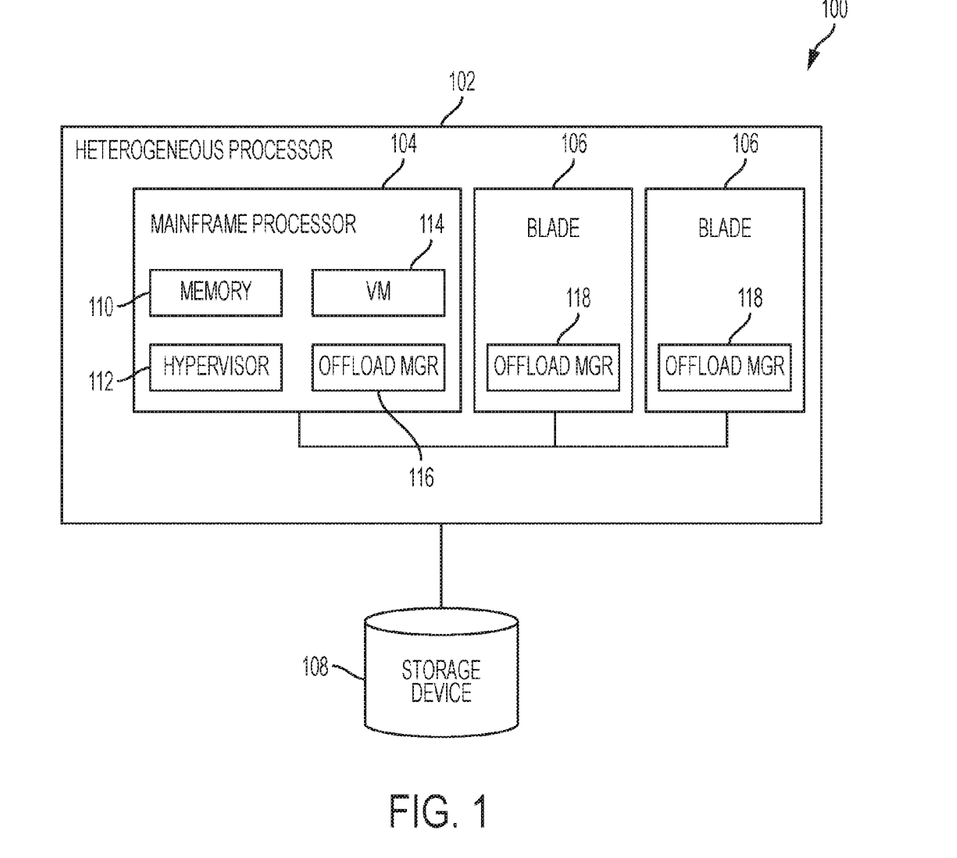
FIG. 1 is a block diagram of a system for performing transparent virtual machine (VM) offloading in accordance with an embodiment.

VMs provide the ability to quickly and relatively inexpensively create multiple instances of the same VM. If allowed by the VM implementation, multiple VMs can exist simultaneously in a single host machine (host computer system) environment, and the resources of the host machine can be divided among the various VMs. This flexible resource allocation becomes even more useful when combined with the ability to "offload", or "migrate," VMs from one host machine to another. Being able to move a VM quickly and easily from one host machine to another is useful, for example, for load balancing, performing hardware or software upgrades, and/or handling disaster recovery Turning now to FIG. 1, a block diagram of a system 100 for performing transparent VM offloading is generally shown in accordance with an embodiment. FIG. 1 shows a heterogeneous processor 102 that includes a mainframe processor 104 and two blade processors 106. The mainframe processor 104 includes memory 110, a hypervisor 112, a VM 114, and an offload manager 116. In an embodiment, the memory 110 is configured to store both VM state and VM memory corresponding to the VM 114. In an embodiment, the hypervisor 112 is configured to execute both the VM 114 and the offload manager 116. For illustrative purposes only one VM 114 is shown in FIG. 1, however it should be noted that a typical hypervisor can execute multiple VMs. The term "hypervisor" as used herein and as known in the art refers to a low-level application that supports execution of one or more VMs. Also as shown in FIG. 1, the blade processors 106 include an offload manager 118 which can be configured to perform all of a subset of the functions performed by the offload manager 116 on the mainframe processor 104.

The embodiment shown in FIG. 1 also includes a storage device 108 in communication with the heterogeneous processor 102. The storage device 108 is configured to store, for example, VM data associated with the VM 114. The VM data stored in the storage device 108 is typically persistent data that can be stored in a file system. This is contrasted with transient data associated with the VM such as the VM CPU state (e.g. VM state data such as registers) and VM memory contents. In embodiments, the storage device 108 is implemented by network attached storage (NAS) in a centralized storage location that is accessible to the heterogeneous processor 102 via a network (not shown). In embodiments, the blade processors 106 and the mainframe processor 104 all have access to the storage device 108 and thus, when the VM 114 is offloaded to a blade processor 106, the persistent data associated with the VM does not need to be moved as part of the offloading. The VM data can be stored in one storage device 108 as shown in FIG. 1 or across multiple storage devices that may in in multiple locations.

In an embodiment, the heterogeneous processor 118 shown in FIG. 1 is implemented by a zEnterprise® System from IBM. In this embodiment, the mainframe processor 104 can be implemented by a System z® server and the blade processors 106 can be located in an IBM zEnterprise Blade Center Extension (zBX) and implemented by Intel® blade processors and/or Power® blade processors from IBM. When the VM 114 is offloaded from the mainframe processor 104 to a blade processor 106, the blade processor can be configured to emulate the mainframe processor 104. For example, according to embodiments, a kernel-based VM (KVM) guest running on the mainframe processor (and written for a native System/390® architecture) can be migrated to a KVM hypervisor running on an Intel blade processor having an emulated System/390 executing on the Intel instruction set. Embodiments can utilize the private high speed internal network, inter-ensemble data network (IEDN), provided by the zBX for providing a connection between the mainframe computer 104 and the blade processors 106. In embodiment, the IEDN connection can be used to transmit VM memory and VM state data between the mainframe processor 104 and blade processors 106.

Figure 2:
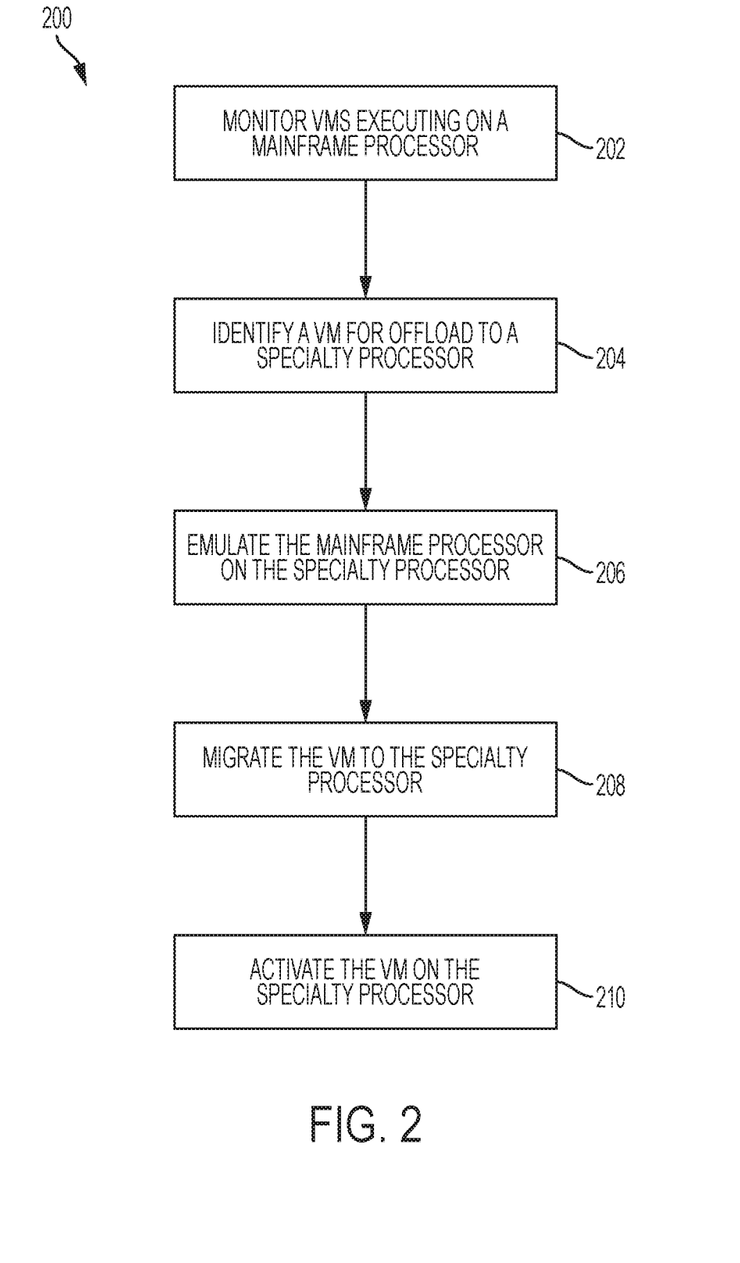
FIG. 2 illustrates a process flow for performing a transparent offload of a VM in accordance with an embodiment.

FIG. 2 illustrates a process flow 200 for performing a transparent offload of a VM in accordance with an embodiment. In embodiments, the processing shown in FIG. 2 is performed by the offload manager 116 executing on the mainframe processor 104 of FIG. 1 in conjunction with the offload manager 118 executing on the target blade processor 106 (i.e., the blade processor that the VM 114 is being offloaded to) of FIG. 1. At block 202, one or more VMs executing on a mainframe processor are monitored to determine current operating characteristics such as, but not limited to: VM state (e.g., idle, near idle); resource utilization; workload; throughput; and/or performance. In embodiments, a tool such as Platform Performance Manager (PPM) from IBM is used to perform at least a portion of the monitoring at block 202.

At block 204, a VM 114 is selected for offload from the mainframe processor to a blade processor. The VM operating characteristics determined at block 202 can be used on their own or combined with mainframe operating characteristics (e.g., number of cores, expected throughput and performance; maximum throughput and performance) to identify a particular VM for offloading to a specialty processor. In addition, information about the heterogeneous processor operating characteristics (e.g., number and type of blade processors, current workloads on blade processors) and/or predicted future workloads (e.g., volume and type) can also be used to identify a VM for offloading. The VM can be identified based on any number of criteria such as, but not limited to: the VM is idle or nearly idle; the VM is using a large share of the processor cycles of the mainframe processor; availability of a specialty processor that can meet the performance requirements of the VM; and/or the type of workload performed by the VM can be optimized using a particular VM. In an embodiment, block 204 is performed to identify a VM for offloading in response to detecting that the mainframe processor is maxed out (e.g., at 100% or nearing 100% central processing unit usage). In this embodiment, a VM having the lowest quality of service (QOS) guarantee can be identified for offloading to a specialty processor. The target specialty processor can be selected based on, but not limited to: current availability; and configuration match for workload associated with the VM. The determining that the mainframe processor is maxed out can be based on a threshold number (e.g. 100%, 99%, 90%, 80%) that can be modified (e.g., it is programmable) and that can vary between different VMs. In an embodiment, the VM is identified based on its using more than a threshold number (e.g. 100%, 99%, 90%, 80%) of the resources; this threshold number can be modified (e.g., it is programmable) and it can vary between different VMs.

Processing continues at block 206 of FIG. 2, where the mainframe processor is emulated on the target specialty processor. In an embodiment, the emulation is initiated and/or performed by offload manager code located in the target specialty processor.

Still referring to FIG. 2, at block 208, the VM is offloaded to the target specialty processor. Embodiments can utilize any known manner of capturing and storing a current state and memory contents of the VM. For example, U.S. Pat. No. 8,671,256 describes migrating contents of a memory on a VM by performing an iterative process of copying changed memory contents to a source machine until the number of changes is less than a threshold. At this point, the VM is paused or quiesced on the source computer, a final iteration of the memory copy process is undertaken including the additional CPU state such as register values, and the VM is started on the target computer. At such time as operation is resumed on the target VM, the source hypervisor is informed by the target hypervisor and the source VM is destroyed on the source hypervisor. A similar process can be utilized by embodiments described herein with the contents of the memory on the VM being stored on the target specialty processor in a suspended or running state. Once the iterative process of copying the changed memory contents is completed, the state of the VM at the time that the last memory content was copied can be captured and stored on the target specialty processor. The state includes information that is utilized to restart the VM on a target machine such as, but not limited to registers, hardware buffers such as network card buffers, input/output (I/O) caches, and/or other transient storage.

At block 210, the VM is activated on the target specialty processor. In an embodiment, this can be performed by an offload manager executing on the specialty processor. The offload manager can perform various offload operations to receive and activate the VM based on the date received from the mainframe processor. Operations performed by the offload manager can include un-packaging and storing the received VM state data and VM memory data into memory on the target specialty processor. In an embodiment, the migration manager provides the target specialty processor with access information about the persistent VM data stored, for example in storage device 108 of FIG. 1.

Figure 3:
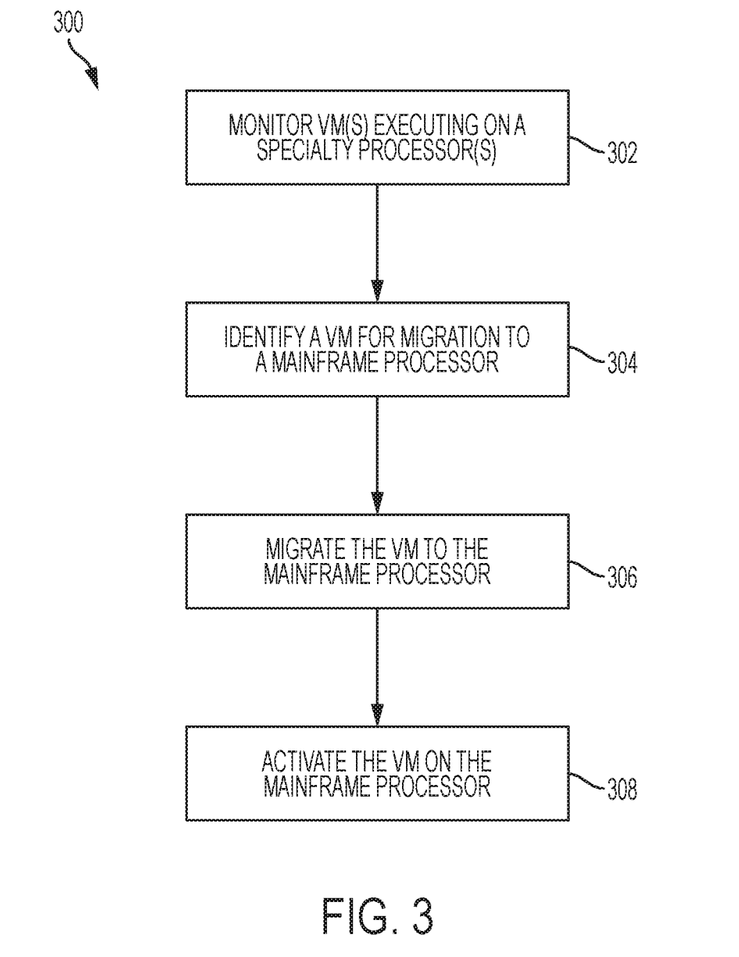
FIG. 3 illustrates a process flow for transparently migrating a VM back to an originating processor in accordance with an embodiment.

Turning now to FIG. 3, a process flow 300 for migrating a VM back to an originating processor (e.g., a mainframe processor) is generally shown in accordance with an embodiment. In embodiments, the processing shown in FIG. 3 is performed by the offload manager 118 executing on a blade processor 106 of FIG. 1 in conjunction with the offload manager 116 executing on the mainframe processor 104 of FIG. 1. At block 302, in a manner similar to the processing described above with respect to block 202 of FIG. 2, the VM(s) executing on the specialty processor(s) are monitored to determine current operating characteristics. At block 304, using the kids of data described above with respect to block 204 of FIG. 2, a VM is identified for migration from the specialty processor back to the mainframe processor. For example, the VM may be using, or predicted to use, fewer resources (e.g., less than a threshold number); or the VM may currently be in a non-idle state (or expected to be leaving an idle state in the near future). Processing continues at block 306, where the VM is migrated from the specialty processor back to the mainframe processor, and at block 308, the VM is activated on the mainframe processor.

Figure 4:
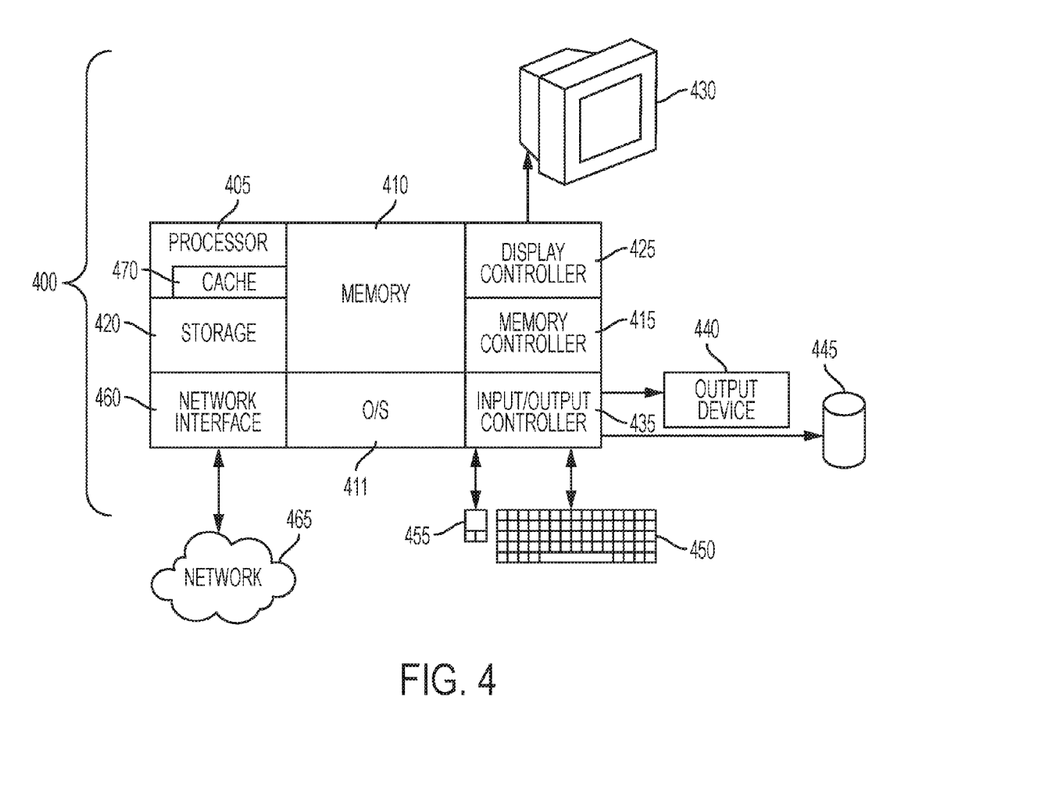
FIG. 4 is a block diagram of a computer system for performing transparent VM offloading in accordance with an embodiment.

Turning now to FIG. 4, a block diagram of a computer system 400 for performing VM offloading is generally shown in accordance with an embodiment. Systems and methods for VM offloading may be implemented in hardware, software (e.g., firmware), or a combination thereof. In some embodiments, the methods may be implemented, at least in part, in hardware and may be part of the microprocessor of a special or general-purpose computer system 400, such as a mobile device, personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The OS 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the systems and methods for performing a VM migration in accordance with embodiments described herein.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. Embodiments can also provide remote direct memory access (RDMA) or RDMA over other mediums such as, but not limited to TCP/IP. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for performing VM migration according to this disclosure may be embodied, in whole or in part, in computer program products or in computer systems 400, such as that illustrated in FIG. 4.

Technical effects and benefits include the ability to supplement expensive compute engines with less expensive compute engines capable of emulating the expensive compute engines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method of offloading virtual machines (VMs), the method comprising:
monitoring operating characteristics of a VM executing on a mainframe processor of a heterogeneous processor;

identifying the VM for offload from the mainframe processor to a specialty processor of the heterogeneous processor, the identifying based on the operating characteristics of the VM indicating that the VM is using at least a threshold number of resources on the mainframe processor, wherein the identifying is further based on the operating characteristics of the VM indicating less than a second threshold number of resources on the mainframe processor and that the VM is in an idle state;

wherein the specialty processor is configured to process a specific type of workload using an instruction set that is different than and that does not support all of the functions of the instruction set of the mainframe processor;

emulating, by the specialty processor, the mainframe processor;

migrating the VM from the mainframe processor to the specialty processor, the migrating including transmitting a VM memory and a VM state data of the VM from the mainframe processor to the specialty processor via a private high speed network that is internal to the heterogeneous processor;

activating the VM on the specialty processor;

migrating the VM back to the mainframe processor in response to a determination that the VM is in a non-idle state; and activating the VM on the mainframe processor.

2. The method of claim 1, further comprising monitoring operating characteristics of the mainframe processor, wherein the identifying is further based on the operating characteristics of the mainframe processor.

3. The method of claim 1, further comprising monitoring operating characteristics of the heterogeneous processor, wherein the identifying is further based on the operating characteristics of the heterogeneous processor.

4. A system for offloading virtual machines (VMs), the system comprising:

a memory having computer readable instructions; and a processor for executing the computer readable instructions, the computer readable instructions including:

monitoring operating characteristics of a VM executing on a mainframe processor of a heterogeneous processor;

identifying the VM for offload from the mainframe processor to a specialty processor of the heterogeneous processor; the identifying based on the operating characteristics of the VM indicating that the VM is using at least a threshold number of resources on the mainframe processor, wherein the identifying is further based on the operating characteristics of the VM indicating less than a second threshold number of resources on the mainframe processor and that the VM is in an idle state;

wherein the specialty processor is configured to process a specific type of workload using an instruction set that is different than and that does not support all of the functions of the instruction set of the mainframe processor;

emulating, by the specialty processor, the mainframe processor;

migrating the VM from the mainframe processor to the specialty processor, the migrating including transmitting a VM memory and a VM state data of the VM from the mainframe processor to the specialty processor via a private high speed network that is internal to the heterogeneous processor;

activating the VM on the specialty processor;

migrating the VM back to the mainframe processor in response to a determination that the VM is in a non-idle state; and activating the VM on the mainframe processor.

5. The system of claim 4, wherein the computer readable instructions further include monitoring operating characteristics of the mainframe processor, wherein the identifying is further based on the operating characteristics of the mainframe processor.

6. The system of claim 4, wherein the computer readable instructions further include monitoring operating characteristics of the heterogeneous processor, wherein the identifying is further based on the operating characteristics of the heterogeneous processor.

7. A computer program product for migrating a virtual machine (VM), the computer program product comprising a computer readable storage medium having program code embodied therewith, the program code executable by a processor for:

monitoring operating characteristics of a VM executing on a mainframe processor of a heterogeneous processor;

identifying the VM for offload from the mainframe processor to a specialty processor of the heterogeneous processor, the identifying based on the operating characteristics of the VM indicating that the VM is using at least a threshold number of resources on the mainframe processor, wherein the identifying is further based on the operating characteristics of the VM indicating less than a second threshold number of resources on the mainframe processor and that the VM is in an idle state;

wherein the specialty processor is configured to process a specific type of workload using an instruction set that is different than and that does not support all of the functions of the instruction set of the mainframe processor;

emulating, by the specialty processor, the mainframe processor;

migrating the VM from the mainframe processor to the specialty processor, the migrating including transmitting a VM memory and a VM state data of the VM from the mainframe processor to the specialty processor via a private high speed network that is internal to the heterogeneous processor;

activating the VM on the specialty processor;

migrating the VM back to the mainframe processor in response to a determination that the VM is in a non-idle state; and activating the VM on the mainframe processor.

* * * * *